(12) United States Patent
Wang et al.

(10) Patent No.: US 8,682,065 B2
(45) Date of Patent: Mar. 25, 2014

(54) DISTANCE METRIC LEARNING WITH FEATURE DECOMPOSITION

(75) Inventors: Meng Wang, Beijing (CN); Xian-Sheng Hua, Beijing (CN)

(73) Assignee: Microsoft Corporation, Redmond, WA (US)

( * ) Notice: Subject to any disclaimer, the term of this patent is extended or adjusted under 35 U.S.C. 154(b) by 994 days.

(21) Appl. No.: 12/344,018

(22) Filed: Dec. 24, 2008

(65) Prior Publication Data

US 2010/0158396 A1     Jun. 24, 2010

(51) Int. Cl.
*G06K 9/00*         (2006.01)

(52) U.S. Cl.
USPC .......................................... 382/165; 382/225

(58) Field of Classification Search
USPC ................................................. 382/165, 225
See application file for complete search history.

(56) References Cited

U.S. PATENT DOCUMENTS

| | | | |
|---|---|---|---|
| 5,703,964 A * | 12/1997 | Menon et al. | 382/228 |
| 6,446,068 B1 | 9/2002 | Kortge | |
| 6,941,321 B2 | 9/2005 | Schuetze et al. | |
| 7,167,578 B2 | 1/2007 | Blake et al. | |
| 7,353,224 B2 | 4/2008 | Chen et al. | |
| 2003/0074369 A1 * | 4/2003 | Schuetze et al. | 707/103 R |
| 2005/0117801 A1 * | 6/2005 | Davis et al. | 382/173 |
| 2005/0265607 A1 * | 12/2005 | Chang | 382/224 |
| 2007/0286528 A1 | 12/2007 | Podilchuk | |
| 2008/0199075 A1 * | 8/2008 | Gokturk et al. | 382/173 |
| 2008/0270386 A1 * | 10/2008 | Ohi et al. | 707/5 |
| 2009/0037458 A1 * | 2/2009 | Meyer et al. | 707/102 |
| 2009/0098515 A1 * | 4/2009 | Das et al. | 434/107 |
| 2009/0099985 A1 * | 4/2009 | Tesauro et al. | 706/12 |
| 2009/0154795 A1 * | 6/2009 | Tan et al. | 382/155 |
| 2011/0004578 A1 * | 1/2011 | Momma et al. | 706/12 |
| 2011/0081074 A1 * | 4/2011 | Rousson et al. | 382/160 |

OTHER PUBLICATIONS

Bar-Hillel, et al., "Learning Distance Functions using Equivalence Relations", retrieved on Oct. 22, 2008 at <<http://www.cs.huji.ac.il/daphna/papers/rca-icml.pdf>>, ACM ICML-2003, 2003, pp. 1-8.

Davis, et al.,"Information-Theoretic Metric Learning", retrieved on Oct. 22, 2008 at <<http://www.cs.utexas.edu/jdavis/papers/davis_nips06_itml.pdf>>, ACM ICML, 2007, pp. 209-216.

Fu, et al., "Locally Adaptive Subspace and Similarity Metric Learning for Visual Data Clustering and Retrieval", retrieved on Oct. 22, 2008 at <<http://www.ifp.uiuc.edu/yunfu2/papers/Yun-Zhu-CVIU.pdf>>, Computer Vision and Image Understanding, vol. 110, No. 3, 2008, pp. 390-402.

Globerson, et al., "Metric Learning by Collapsing Classes", retrieved on Oct. 22, 2008 at <<http://books.nips.cc/papers/files/nips18/NIPS2005_0388.pdf>>, NIPS 2005, 2005, pp. 1-8.

(Continued)

*Primary Examiner* — Jingge Wu
(74) *Attorney, Agent, or Firm* — Carole Boelitz; Micky Minhas (57) ABSTRACT

This disclosure describes various exemplary systems, computer program products, and methods for feature distance metric learning with feature decomposition (DMLFD). The disclosure describes decomposing a high-dimensional feature space into one or more low-dimensional feature spaces according to minimum dependence. Furthermore, the disclosure describes how the sub-metrics are constructed and combined to form a global metric.

20 Claims, 6 Drawing Sheets

(56) References Cited

OTHER PUBLICATIONS

He, et al., "Manifold-Ranking based Image Retrieval", retrieved on Oct. 22, 2008 at <<http://www.au.tsinghua.edu.cn/szll/bodao/zhangchangshui/english/paper/ACM04_hjr.pdf>>, ACM MM'04 (1-58113-893-8/04/0010), 2004, pp. 1-8.

McFee, "Distance Metric Learning from Pairwise Proximities", retrieved on Oct. 22, 2008 at <<http://www-cse.ucsd.edu/bmcfee/papers/dmlp.pdf>>, UCSD CSE Research exam, 2008, pp. 1-18.

Qi, et al., "A Joint Appearance-Spatial Distance for Kernel-based Image Categorization", retrieved on Oct. 22, 2008 at <<http://mail2.ustc.edu.cn/qgj/papers/CVPR-2008b-gjqi.pdf>>, IEEE CVPR, 2008, pp. 1-8.

Saul, et al., "Think Globally, Fit Locally: Unsupervised Learning of Low Dimensional Manifolds", retrieved on Oct. 22, 2008 at <<http://www.cs.toronto.edu/roweis/papers/llejmlr.pdf>>, Journal of Machine Learning Research, vol. 4, 2003, pp. 119-155.

Shi, et al., "Normalized Cuts and Image Segmentation", retrieved on Oct. 22, 2008 at <<http://www.cs.berkeley.edu/malik/papers/SM-ncut.pdf>>, IEEE Transactions on Pattern Analysis and Machine Intelligence, vol. 22, No. 8, 2000, pp. 888-905.

Tenebaurm, et al., "A Global Geometric Framework for Nonlinear Dimensionality Reduction", retrieved on Oct. 22, 2008 at <<http://web.mit.edu/cocosci/Papers/sci_reprint.pdf>>, Science, vol. 290, 2000, pp. 2319-2323.

Tong, et al., "Graph-based Multi-Modality Learning", retrieved on Oct. 22, 2008 at <<http://www.cs.cmu.edu/jingruih/pdf/MM05-tong.pdf>>, ACM MM'05 (1-59593-044-2/05/0011), 2005, pp. 862-871.

Weinberger, et al., "Distance Metric Learning for Large Margin Nearest Neighbor Classification", retrieved on Oct. 22, 2008 at <<http://books.nips.cc/papers/files/nips18/NIPS2005_0265.pdf>>, MIT Press: Advances in Neural Information Processing Systems, vol. 18, 2006, pp. 1473-1480.

Weinberger, et al., "Metric Learning for Kernel Regression", retrieved on Oct. 22, 2008 at <<http://jmlr.csail.mit.edu/proceedings/papers/v2/weinberger07a/weinberger07a.pdf>>, Conference on Artificial Intelligence and Statistics, Omnipress, 2007, pp. 608-615.

Wu, et al., "Optimal Multimodal Fusion for Multimedia Data Analysis", retrieved on Oct. 22, 2008 at <<http://delivery.acm.org/10.1145/1030000/1027665/p572-wu.pdf?key1=1027665&key2=3860474221&coll=GUIDE&dl=GUIDE&CFID=7747049&CFTOKEN=59543836>>, ACM MM'04 (1-58113-893-8/04/0010), 2004, pp. 572-579.

Xing, et al., "Distance Metric Learning with Application to Clustering with Side Information", retrieved on Oct. 22, 2008 at <<http://ai.stanford.edu/ang/papers/nips02-metric.pdf>>, MIT Press: Advances in Neural Information Processing Systems, vol. 15, 2003, pp. 505-512.

Yang, et al., "An Efficient Algorithm for Local Distance Metric Learning", retrieved on Oct. 22, 2008 at <<http://www.cs.cmu.edu/rahuls/pub/aaai2006-rahuls.pdf>>, American Association for Artificial Intelligence, 2006, pp. 1-5.

Yang, et al.,"Distance Metric Learning: A Comprehensive Survey", retrieved on Oct. 22, 2008 at <<http://www.cs.cmu.edu/liuy/frame_survey_v2.pdf>>, Technical report, Michigan State University CSE, 2006, pp. 1-51.

Ye, et al., "Similarity Measure Learning for Image Retrieval using Feature Subspace Analysis", retrieved on Oct. 22, 2008 at <<http://ieeexplore.ieee.org/stamp/stamp.jsp?arnumber=1238113&isnumber=27771>>, IEEE ICCIMA'03 (0/7695-1957-1/03), 2003, pp. 1-6.

Yeh, et al., "Manifold Learning, a Promised Land or Work Progress?", retrieved on Oct. 22, 2008 at <<http://www.uweb.ucsb.edu/meichen/papers/icme05.pdf>>, IEEE ICME, 2005, pp. 1154-1157.

Snoek, et al., "Early Versus Late Fusion in Semantic Video Analysis", retrieved on Oct. 22, 2008 at <<http://staff.science.uva.nl/cgmsnoek/pub/snoek-earlylate-acm2005.pdf>>, ACM MM'05 (1-59593-044-2/05/0011), 2005, pp. 1-4.

* cited by examiner

DISTANCE METRIC LEARNING WITH FEATURE DECOMPOSITION

BACKGROUND

There are numerous techniques available for image categorization. Many machine learning algorithms rely on a distance metric for the input of data patterns. Distance metric learning (DML) provides a distance metric for input space of data from a given collection of pairs. The given collection of pairs contains similar or dissimilar points that preserve the distance relation among the training data.

Providing a good distance metric in feature space is crucial in real-world application. Good distance metrics are important to many computer vision tasks, such as an image classification and a content-based image retrieval. The distance metric is explicitly learned to minimize a distance between data points with equivalence constraints and maximize the distance between data points in inequivalence constraints.

DML aims to construct an appropriate distance metric for a given learning task. For example, image categorization, which facilitates semantic-level image retrieval by classifying a set of unlabeled images into pre-defined classes, has benefited from such a technique. However, the application of DML in the multimedia domain frequently encounters problems in terms of both computation and performance due to high-dimensional features space. Specifically, computational costs of many DML algorithms scale at least quadratically with respect to the dimensionality of the feature space and will therefore be relatively expensive when feature dimensions are high, potentially leading to an inaccurate classification. Therefore, there is a need for a metric learning algorithm which will significantly reduce the computational cost of metric learning methods and improve their performance.

SUMMARY

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In view of the above, this disclosure describes various exemplary methods for distance metric learning with feature decomposition (DMLFD). The disclosure describes how the features are decomposed into groups according to minimum dependence, how to construct a sub-metric for each group, and combining the sub-metrics to form a global metric.

BRIEF DESCRIPTION OF THE DRAWINGS

The detailed description is described with reference to the accompanying figures. In the figures, the left-most digit of a reference number identifies the figure in which the reference number first appears. The use of the same reference numbers in different figures indicates similar or identical items.

DETAILED DESCRIPTION

This disclosure describes various exemplary methods and computer programming products for distance metric learning with feature decomposition (DMLFD). The disclosure further describes how the features are grouped according to a minimum dependence criterion.

In another aspect, a sub-metric for each group is constructed and the sub-metrics are then combined to form a global metric. Furthermore, the groups may be defined using a normalized cut algorithm.

The DMLFD described herein is not limited to any particular application, but may be applied to many contexts and environments. In one implementation, the DMLFD may be employed in image/video classification, information retrieval, clustering, annotation, search, and the like. In another implementation, the DMLFD may be employed in an environment which does not include a computing environment.

Exemplary Distance Metric Learning with Feature Decomposition

Figure 1:
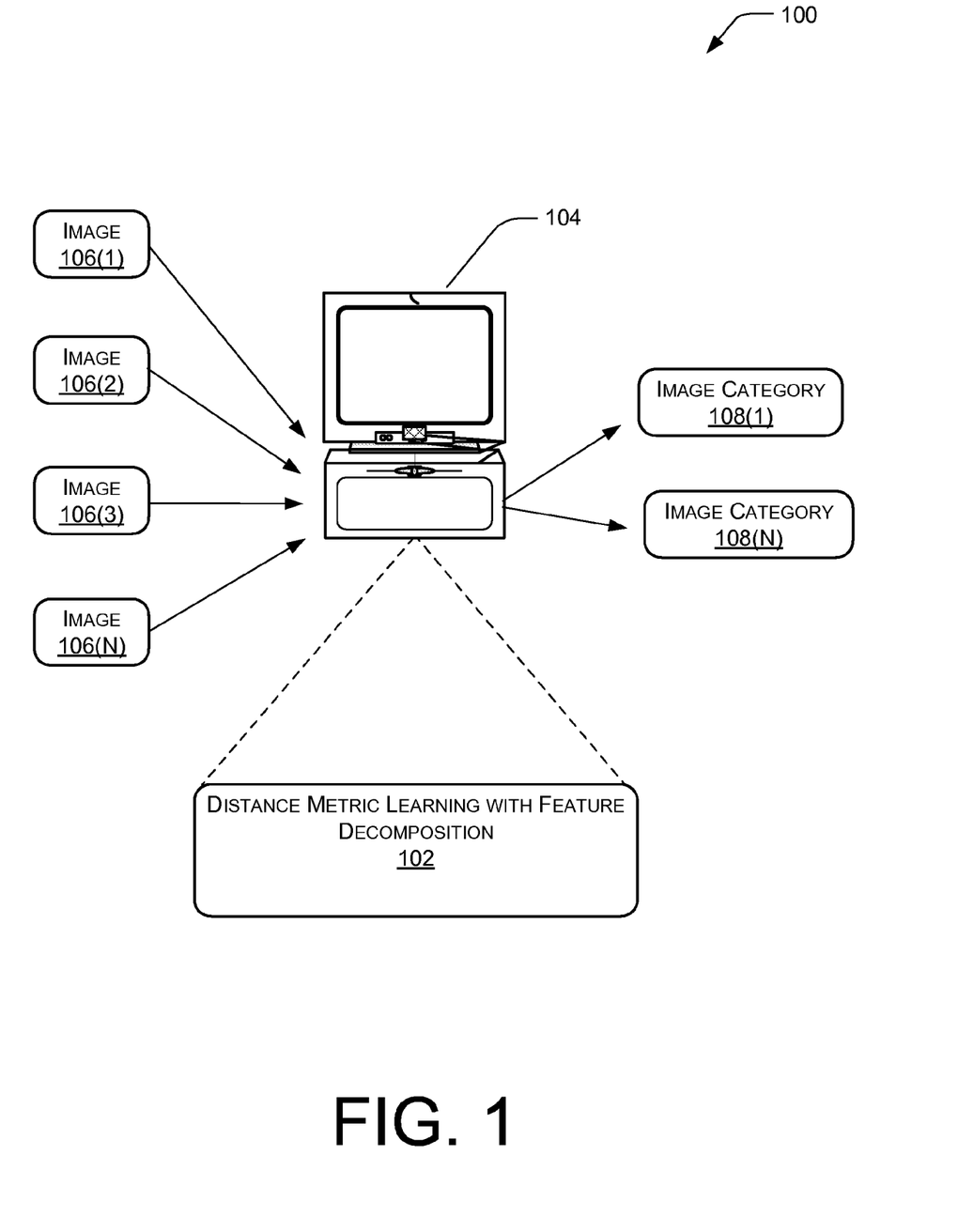
FIG. 1 illustrates a block diagram for an exemplary computing environment for distance metric learning with feature decomposition.

FIG. 1 illustrates a block diagram of an exemplary environment 100 for a distance metric learning with feature decomposition (DMLFD) in accordance with one embodiment. Implementations of DMLFD may include but are not limited to, a tool, a method, a solver, an application program, a service, technology resources which include access to the internet, part of a web browser, part of a search engine, technology resources which may not include access to the internet, and the like. In this implementation, DMLFD 102 is implemented as an application program. DMLFD 102 can be implemented, at least in part, by one or more suitable computing devices, such as computing device(s) 104. Other computing devices that may be used include, but are not limited to, a personal computer, a laptop computer, a desktop computer, a digital camera, a personal digital assistance, a cellular phone, a video player, and other types of image sources.

Images 106(1), 106(2), 106(3), 106(N) are loaded onto computing device 104 using an input device, a previously generated image set contained on a storage media, or retrieved from an online application such as the internet. Images 106(1)-106(N) may be a still digital image created by an input device such as a digital camera, a scanner, or the like. In other implementations the image may be a moving image such as digital video. Utilizing DMLFD 102, images 106(1)-106(N) are grouped into different image categories 108(1)-108(N). A user may then search for a particular feature according to the image categories 108(1)-108(N). A user may search using an information retrieval system such as a search engine, where the search engine provides an interface that enables the user to perform a specific search query. It should be noted that while DMLFD 102 is described in the context of image categorization in a computing environment, it is to be appreciated and understood that it can be employed in other contexts and environments involving other types of data processing without departing from the spirit and scope of the claimed subject matter.

Figure 2:
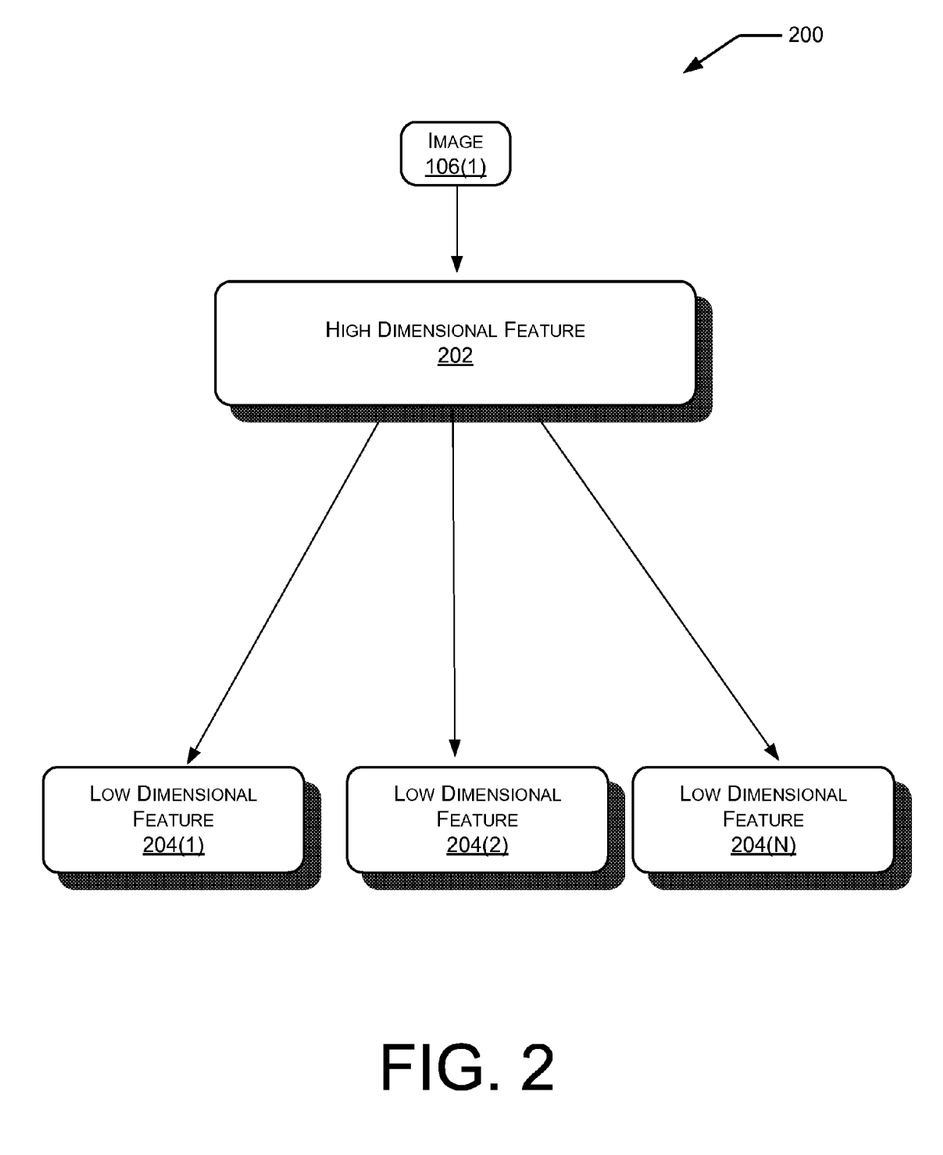
FIG. 2 illustrates a block diagram of an exemplary decomposition.

FIG. 2 illustrates an exemplary decomposition 200 of a high-dimensional feature space 202. A high-dimensional feature space 202 of image 106(1) is decomposed into a set of low-dimensional feature spaces 204(1)-(N). The high-dimensional feature space 202 may describe a large set of features within the content of an image. In addition, the high-dimensional feature may describe information pertaining to symmetries of an object or an object model. However, it is to be appreciated that the high-dimensional feature space may be made up of other image content. The low level features may include features such as, brightness, color, texture, motion, and the like. In addition, the low level features may be a 144-dimensional color correlogram, a 64-dimensional color histogram, a 128-dimensional wavelet texture, a 16-dimensional co-occurrence histogram, and the like. Utilizing these low level features, a 352-dimensional feature vector is obtained.

Figure 3:
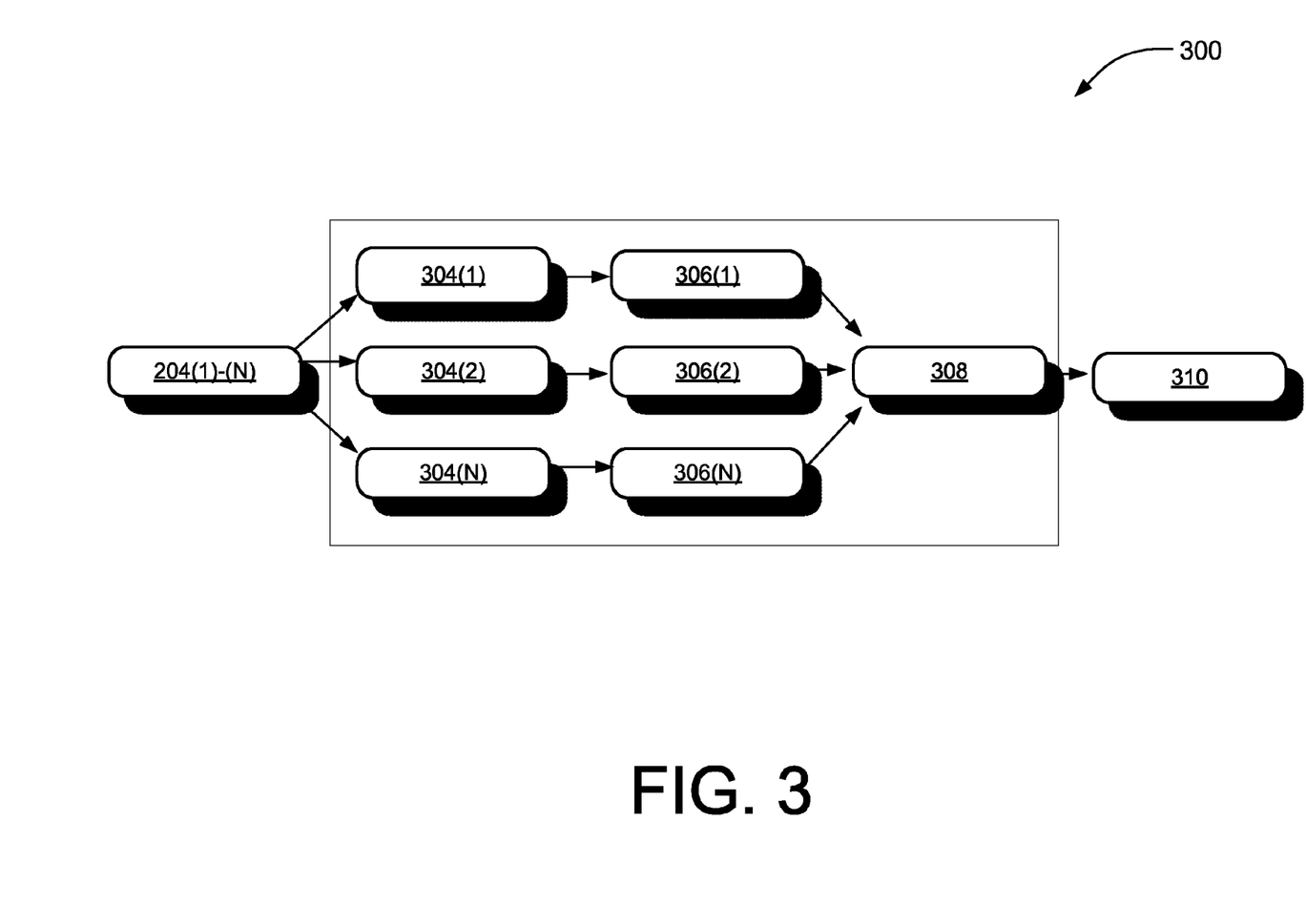
FIG. 3 illustrates a block diagram for an exemplary scheme for a distance metric learning method with feature decomposition.

As illustrated in FIG. 3, each of the low-dimensional feature spaces 204(1)-(N) within exemplary DMLFD 102 are grouped together into feature groups 304(1)-304(N). In one implementation, the feature groups are defined using a normalized cut algorithm. However, it is to be appreciated that the feature groups may be defined using alternative methods. Utilizing a method or an algorithm, such as a normalized cut algorithm, the between group feature correlations are minimized and the within group feature correlations are maximized such that the features that exhibit a strong correlation will remain in the same feature group and will not be separated. Therefore, when a user is searching for a particular feature, similar features will be grouped into the same feature group 304(1)-304(N), allowing the user to perform their search more rapidly and accurately.

One or more sub-metrics 306(1)-(N) are constructed from the corresponding feature groups 304(1)-304(N) using a distance metric learning method. The distance metric learning method may be a relevant component analysis, a discriminative component analysis, a neighborhood component analysis, a metric learning by collapsing classes, metric learning for kernel regression, information-theoretic metric learning, probabilistic global distance metric learning, and the like. The sub-metrics 306(1)-306(N) are then combined to form a global metric 308. Global metric 308 provides results 310 which may be image categorization, annotation, search, clustering, and the like. The results may be displayed and presented to the user to assist in information retrieval.

Feature Decomposition

As previously stated, the feature decomposition method of an image should follow the principle that the between-group feature correlations are minimized and the within-group feature correlations are maximized such that there is a strong correlation between features to permit accurate image classification. In one embodiment, the feature decomposition begins with l training samples $(x_1, y_1), (x_2, y_2), \ldots, (x_l, y_l)$. Examples of training samples may include, without limitation, the Corel5000 dataset, the Reuters-21478 dataset, the TRECVID2005 dataset, and the like.

Utilizing the l training samples, a covariance matrix may be computed as shown in the equation below:

$$C = \frac{1}{l}\sum_{k=1}^{l}(x_k - \mu)(x_k - \mu)^T \quad (1)$$

where $$\mu = \frac{1}{l}\sum_{k=1}^{l}x_k.$$

After calculating the matrix C, the correlation between the i-th feature and the j-th feature of an image may be defined by:

$$R_{ij} = \frac{|C_{ij}|}{\sqrt{C_{ii}C_{jj}}} \quad (2)$$

Based upon the $R_{ij}$ correlation, the d-dimensional features are classified into feature groups.

In one embodiment, to place d-dimensional features into the corresponding feature groups, a graph G=(V,E) is defined where the vertices are the features and the edges represent their correlations. The graph is partitioned into subsets using a normalized cut algorithm. However, it is to be appreciated that the image may also be partitioned using alternative methods. Determining the most favorable normalized cut algorithm enables a graph to be partitioned a minimal number of times. In one implementation, the similarities across the sets of vertices are minimized. Such a minimization may be expressed as a generalized eigenvalue problem, where the eigenvectors can be used to construct partitions of the graph. For example, a method for determining a normalized cut algorithm may consist of the following steps: construct the graph G=(V,E); solve $(D-W)_x = \lambda D_x$ for eigenvectors with the smallest eigenvalues; use the eigenvector with the second smallest eigenvalue to partition the graph.

Metric Combination

FIG. 3 illustrates that after the feature groups 304(1)-304(N) are created, a distance metric learning method may be utilized to generate corresponding sub-metrics 306(1)-306(N). In one embodiment, the Mahalanobis distance metric learning method may be used to generate the sub-metrics. However, it is to be appreciated that other distance metric learning methods may be used. Continuing with Mahalanobis distance metric learning method as an example, $M_g$ represents a $d_g \times d_g$ Mahalanobis matrix from a feature group g determined using the normalized cut algorithm discussed above. Each sample x is represented by $x_i^1, x_i^2, \ldots, x_i^G$ for these G groups. One may then calculate the corresponding sub-metric with the equation shown below as:

$$D_g(x_i, x_j) = (x_i^g - x_j^g)^T M_g (x_i^g - x_j^g) \quad (3)$$

As described in FIG. 3, the corresponding sub-metrics are then combined using the following linear combination:

$$D_{DMLFD}(x_i, x_j) = \sum_{g=1}^{G} w_g (x_i^g - x_j^g)^T M_g (x_i^g - x_j^g) \quad (4)$$

In one embodiment, the optimization of $w_g$ of equation (4) above is formulated utilizing a heuristic method which sets $w_g$ to be proportional to the ratio between class distance and within class distance. However, it is to be appreciated that wg may also be computed using alternative methods. Using this heuristic method, $w_g$ may be calculated as:

$$w_g = \frac{\sum\limits_{k=1}^{K}(\mu_k-\mu)^T M_g(\mu_k-\mu)}{\sum\limits_{k=1}^{K}\sum\limits_{y_i=k}(x_i-\mu_k)^T M_g(x_i-\mu_k)} \Bigg/ \sum_{g=1}^{G}\frac{\sum\limits_{k=1}^{K}(\mu_k-\mu)^T M_g(\mu_k-\mu)}{\sum\limits_{k=1}^{K}\sum\limits_{y_i=k}(x_i-\mu_k)^T M_g(x_i-\mu_k)} \qquad (5)$$

Figure 4:
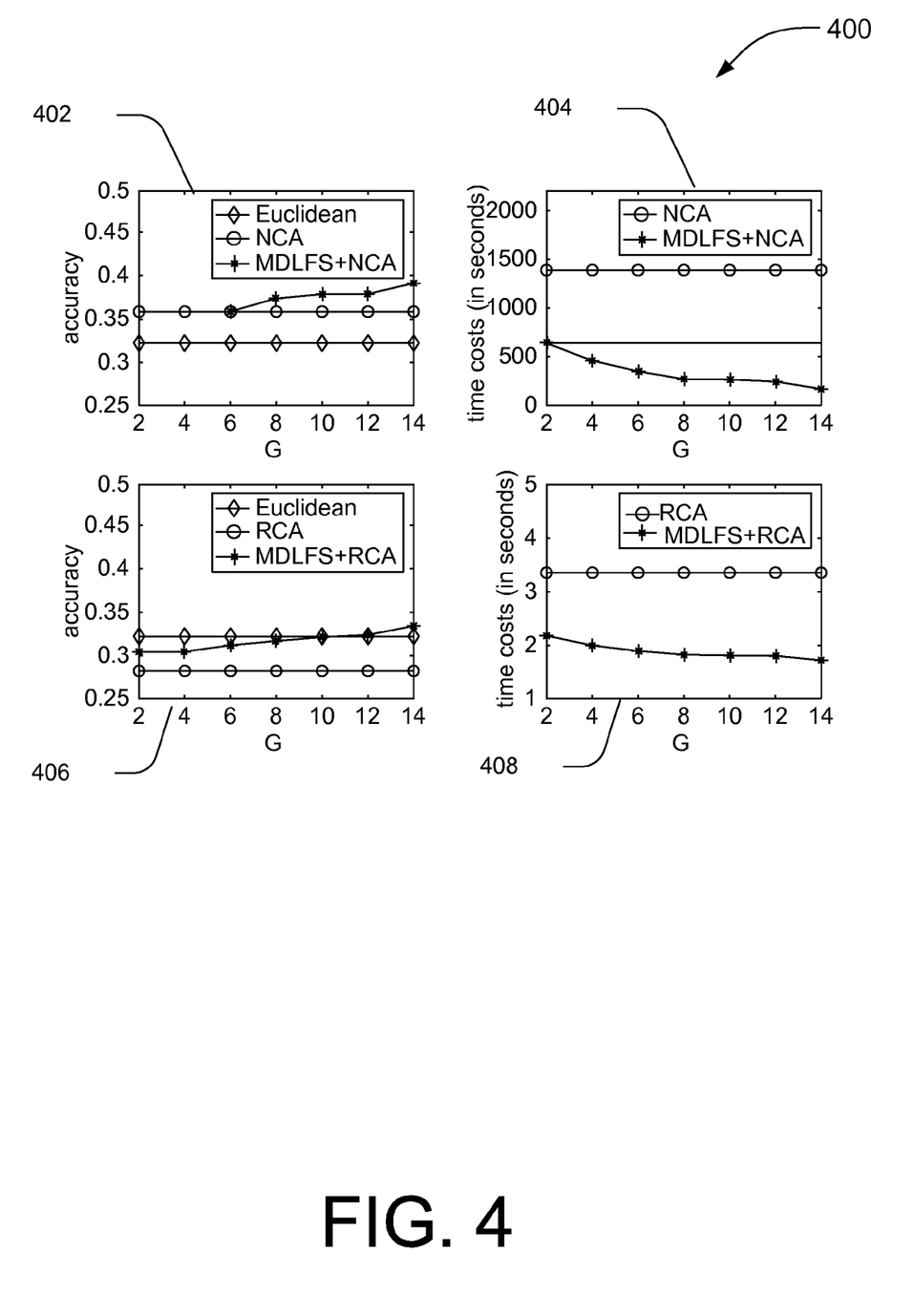
FIG. 4 illustrates the reduction of computational costs according to the exemplary scheme for a distance metric learning method with feature decomposition according to FIG. 3.

Illustrated in FIG. 4 is exemplary feature decomposition using a normalized cut algorithm applied to distance metric learning methods 400. An advantage is that DMLFD reduces computational costs in comparison with a distance metric learning (DML) method. For example Table 1, below, demonstrates computational costs of several distance metric learning methods that have been previously tried but were found to be too expensive.

TABLE 1

| Distance Metric Learning Method | Cost |
| --- | --- |
| Relevant Component Analysis (RCA) | $O(ld^2 + d^3)$ |
| Discriminative Component Analysis | $O(ld^2 + d^3)$ |
| Neighborhood Component Analysis (NCA) | $O(l^2 d^2)$ |
| Metric Learning by Collapsing Classes | $O(l^2 d^2)$ |
| Metric Learning for Kernel Regression | $O(l^2 d^2)$ |
| Information-Theoretic Metric Learning | $O(l^2 d^2)$ |
| Probabilistic Global Distance Metric Learning | $O(l^2 d^2 + d^3)$ |

Further, FIG. 4 illustrates the comparisons of directly applying a distance metric learning method versus applying DMLFD in terms of both average classification accuracy and computational costs. For example, graphs 402 and 404 illustrate results for both classification accuracy as well as computational costs, respectively, when the distance metric learning method Neighborhood Component Analysis (NCA) along with DMLFD is applied. As shown in 402, utilizing DMLFD reduces performance degradation and thus improves classification accuracy (y-axis) for group number G (x-axis). As shown in 404, utilizing the DMLFD in conjunction with the distance metric learning method NCA, the computational costs as shown on the y-axis is dramatically reduced as the G group number increases along the x-axis. The group number G may vary depending upon the experimental conditions. For example, if a high classification accuracy is the goal, then G can be tuned by cross-validation and the value that achieves the highest classification accuracy should be selected. However, if the focus is computational costs, then the larger G value the better.

As a further example, graph 406 makes use of the DMLFD approach in combination with the distance metric learning method Relevant Component Analysis (RCA). Again, the classification accuracy is vastly improved. Graph 408 illustrates marked improvement of the computational costs when the DMLFD approach is used.

Therefore, as shown in graphs 402, 404, 406, and 408, image categorization using the DMLFD approach increases both the effectiveness and the efficiency of the classification process.

Exemplary Image Categorization Method

Figure 5:
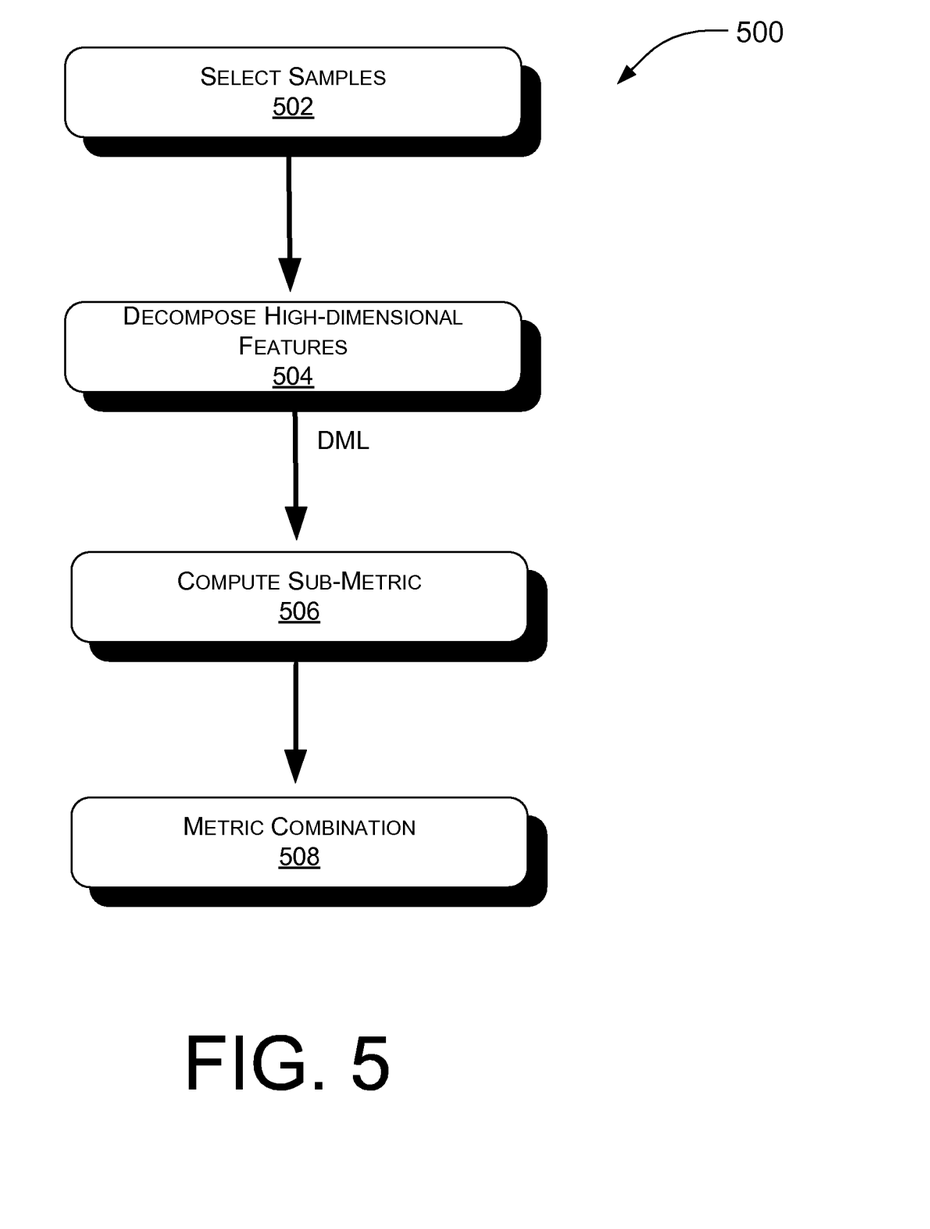
FIG. 5 illustrates a process flow for an exemplary image categorization method.

FIG. 5 illustrates an exemplary method 500 for image categorization using DMLFD. The process 500 begins by selecting l samples as represented by block 502. For example l samples may be a Corel5000 dataset including 50 semantically diverse categories with 100 images per category. Within these 50 categories, 37 of the categories may contain a certain target object for recognition while the remaining 13 categories have images for natural scenery. The high level features are decomposed into low-level features as shown in block 504. The low-level features consist of (1) 144-dimensional color correlogram; (2) 64-dimensional color histogram; (3) 128-dimensional wavelet texture; and (4) 16-dimensional co-occurrence histogram. A distance metric learning method, such as those listed in Table 1 above, is applied resulting in the corresponding sub-metric groups as shown in block 506. The sub-metric groups are combined as shown in block 508 producing a result for classification of the image. The results may be displayed and presented to the user to assist in information retrieval.

Computing Environment

Figure 6:
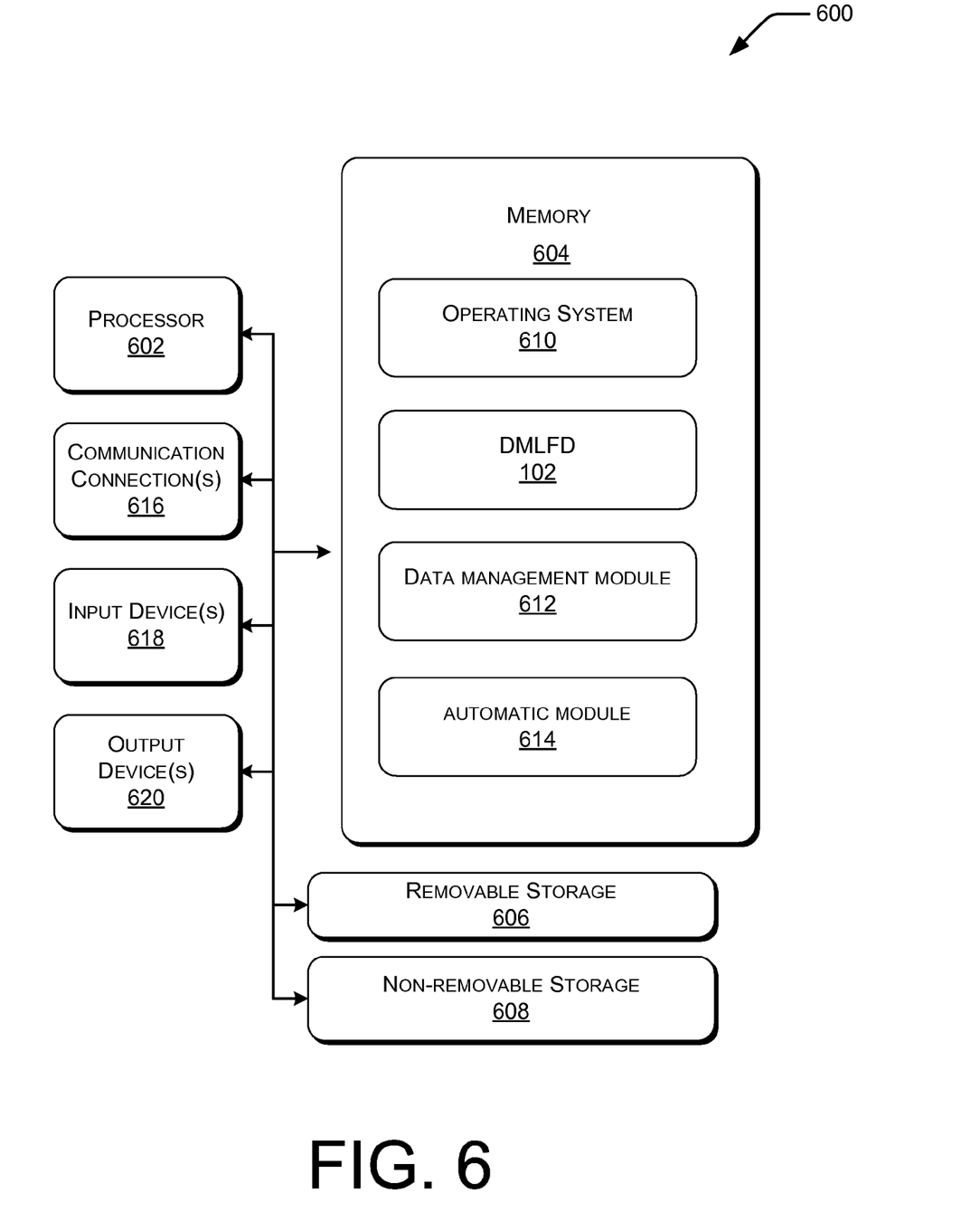
FIG. 6 illustrates a block diagram for an exemplary computing environment according to DMLFD.

FIG. 6 is a schematic block diagram of an exemplary general operating system 600. The system 600 may be configured as any suitable system capable of implementing the distance metric learning with feature decomposition (DLMFD) 102. In one exemplary configuration, the system comprises at least one processor 602 and memory 604. The processing unit 602 may be implemented as appropriate in hardware, software, firmware, or combinations thereof. Software or firmware implementations of the processing unit 602 may include computer- or machine-executable instructions written in any suitable programming language to perform the various functions described.

Memory 604 may store programs of instructions that are loadable and executable on the processor 602, as well as data generated during the execution of these programs. Depending on the configuration and type of computing device, memory 604 may be volatile (such as RAM) and/or non-volatile (such as ROM, flash memory, etc.). The system may also include additional removable storage 606 and/or non-removable storage 608 including, but not limited to, magnetic storage, optical disks, and/or tape storage. The disk drives and their associated computer-readable medium may provide non-volatile storage of computer readable instructions, data structures, program modules, and other data for the communication devices.

Memory 604, removable storage 606, and non-removable storage 608 are all examples of the computer storage medium. Additional types of computer storage medium that may be present include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by the computing device 104.

Turning to the contents of the memory 604 in more detail, may include an operating system 610 and one or more DMLFD application program 102. For example, the system 600 illustrates architecture of these components residing on one system or one server. Alternatively, these components may reside in multiple other locations, servers, or systems. For instance, all of the components may exist on a client side. Furthermore, two or more of the illustrated components may combine to form a single component at a single location.

In one implementation, the memory 604 includes the DMLFD 102, a data management module 612, and an automatic module 614. The data management module 612 stores and manages storage of information, such as images, ROI, equations, and the like, and may communicate with one or more local and/or remote databases or services. The automatic module 614 allows the process to operate without human intervention.

The system 600 may also contain communications connection(s) 616 that allow processor 602 to communicate with servers, the user terminals, and/or other devices on a network. Communications connection(s) 616 is an example of communication medium. Communication medium typically embodies computer readable instructions, data structures, and program modules. By way of example, and not limitation, communication medium includes wired media such as a wired network or direct-wired connection, and wireless media such as acoustic, RF, infrared and other wireless media. The term computer readable medium as used herein includes both storage medium and communication medium.

The system 600 may also include input device(s) 618 such as a keyboard, mouse, pen, voice input device, touch input device, etc., and output device(s) 620, such as a display, speakers, printer, etc. The system 600 may include a database hosted on the processor 602. All these devices are well known in the art and need not be discussed at length here.

CONCLUSION

Although embodiments for processing media data on a media system have been described in language specific to structural features and/or methods, it is to be understood that the subject of the appended claims are not necessarily limited to the specific features or methods described. Rather, the specific features and methods are disclosed as exemplary implementations.

What is claimed is:

1. A method to be executed on a computing device, the method comprising:
   generating a matrix of a distribution of features of one or more images;
   determining correlations between the features of the one or more images as a function of the generated matrix;
   grouping the features into one or more groups based at least in part on the correlations such that between-group correlations are minimized and within-group correlations are maximized;
   constructing a sub-metric for each of the one or more groups; and
   combining all of the sub-metrics into a global metric.

2. The method as recited in claim 1, wherein the features are decomposed into the one or more groups based on the correlations between the features using a normalized cut process.

3. The method of claim 2, wherein the normalized cut process comprises:
   creating a weighted graph;
   setting a weight to be a measure of a similarity between two points located on the weighted graph; and
   determining a small partition for the weighted graph, wherein the small partition presents similarities among a set of vertices.

4. The method as recited in claim 1, wherein the sub-metric is constructed utilizing a distance metric learning method comprising at least one of a relevant component analysis, a discriminative component analysis, a neighborhood component analysis, a metric learning by collapsing classes, a metric learning for kernel regression, an information-theoretic metric learning, or a probabilistic global distance metric learning.

5. The method as recited in claim 1, wherein the features comprise a large set of features within content of the one or more images.

6. The method as recited in claim 1, wherein the one or more groups each comprise low-dimensional feature spaces including at least one of a 144-dimensional color correlogram, a 64-dimensional color histogram, a 128-dimensional wavelet texture, or a 16-dimensional co-occurrence histogram.

7. The method as recited in claim 6 further comprising utilizing the low-dimensional feature spaces to obtain a 352-dimensional feature vector.

8. The method as recited in claim 1 further comprising utilizing the global metric for image categorization.

9. The method as recited in claim 1, wherein the determining the correlations includes determining a correlation between an i-th feature and a j-th feature of the generated matrix.

10. A method to be executed on a computing device, the method comprising:
    determining correlations between features of one or more images based at least in part on a matrix of a distribution of the features;
    grouping the features into one or more groups based at least in part on the correlations such that inter-group correlations are minimized and intra-group correlations are maximized;
    constructing a sub-metric for each of the one or more groups using a distance metric learning method; and
    combining all of the sub-metrics into a global metric.

11. The method as recited in claim 10, wherein the sub-metric construction is accomplished with pairwise constraints, the pairwise constraints comprise equivalence constraints or inequivalence constraints.

12. The method as recited in claim 10 further comprising classifying an image according to the global metric.

13. The method as recited in claim 10, wherein the combining all of the sub-metrics into a global metric comprises utilizing a linear combination.

14. One or more computer-readable storage memory having computer-executable instructions that when executed, instruct a processor to perform acts comprising:
    computing a matrix of data distribution as a function of one or more samples, wherein the data distribution comprises a feature distribution;
    computing a correlation between an i-th feature and a j-th feature, wherein the correlation is computed as a function of the computed matrix;
    grouping features into one or more groups based on the correlation between the i-th and the j-th feature, wherein the one or more groups have a minimum between group correlation and a maximum within group correlation;
    calculating one or more sub-metrics utilizing a distance metric learning method; and
    combining the one or more sub-metrics utilizing a linear combination.

15. The one or more computer-readable storage memory of claim 14, wherein the one or more samples comprises $(x_1, y_1), (x_2, y_2), \ldots, (x_l, y_l)$.

16. The one or more computer-readable storage memory of claim 14, further comprising computer-executable instructions that when executed, instruct the processor to perform acts comprising calculating a weight of the one or more sub-metrics to be proportional to a ratio between a class distance and a within class distance.

17. The one or more computer-readable storage memory of claim 14 further comprising computer-executable instructions that when executed, instruct the processor to perform acts comprising performing a normalized cut algorithm to decompose the features into one or more feature groups.

18. The one or more computer-readable storage memory of claim 17, further comprising computer-executable instructions that when executed, instruct the processor to perform acts comprising determining the normalized cut algorithm by:

creating a weighted graph;

setting a weight to be a measure of a similarity between two nodes located on the weighted graph; and    determining a small partition for the weighted graph, wherein the small partition presents similarities among a set of vertices.

19. The one or more computer-readable storage memory of claim 14, wherein the feature distribution includes low level features comprising at least one of a 144-dimensional color correlogram, a 64-dimensional color histogram, a 128-dimensional wavelet texture, or a 16-dimensional co-occurrence histogram.

20. The one or more computer-readable storage memory as recited in claim 19 further comprising computer-executable instructions that when executed, instruct the processor to perform acts comprising utilizing the low level features to obtain a 352-dimensional feature vector.

\* \* \* \* \*